Figure 1:
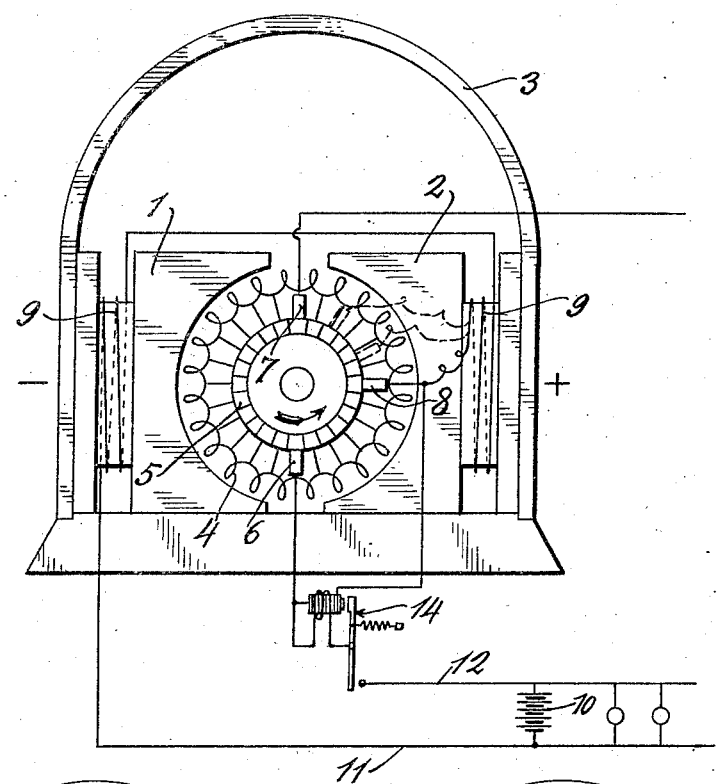

Nov. 2, 1926.

G. H. SETHMAN 1,605,294

VARIABLE SPEED CONSTANT POTENTIAL GENERATOR

Filed August 24, 1925

Inventor

George H. Sethman.

By A. J. O'Brien

Attorney

Patented Nov. 2, 1926.

1,605,294

UNITED STATES PATENT OFFICE.

GEORGE H. SETHMAN, OF DENVER, COLORADO.

VARIABLE-SPEED CONSTANT-POTENTIAL GENERATOR.

Application filed August 24, 1925. Serial No. 51,997.

This invention relates to improvements in variable speed constant potential generators of a type that finds its principal use in connection with the electrical starting and ignition systems of automobiles.

In automobile construction the generator is geared directly to the engine and therefore its speed varies directly with the speed of the engine. It is obvious, therefore, that this type of generator must be so constructed that it will operate successively at greatly varying speeds. This type of generator is usually employed for charging a storage battery which in ordinary cars is a 6-volt battery that is used for furnishing current for the starting motor, lighting system and the ignition system of the engine. Between the battery and the generator an automatic cut-out device is provided that connects the battery to the generator. When the latter has reached a voltage that is slightly above that of the battery, for example, if the battery is a 6-volt battery, the cut-out operates when the generator has attained a voltage of 7 volts. After the pick-up voltage has been attained, which is usually attained when the automobile reaches a speed of approximately ten miles an hour, the voltage of the generator should remain practically constant for any speed at which it may be operated. This regulation has been attained in present constructions by means of a third brush that is placed approximately at right angles to the main commutator brushes and which supplies a shunt field winding. As the speed of the generator increases the field becomes distorted and this, together with the cross magnetization of the armature, tends to vary the field excitation to such an extent that the voltage generated does not exceed a reasonable amount regardless of the speed of the generator.

In this type of generator, however, if for any reason the cut-out mechanism should fail to work and therefore no current should be delivered by the generator to the battery, the cross magnetization of the armature would be reduced practically to zero while the increased voltage would send an increased current through the shunt field, with the result that the voltage constantly increases with the speed until the shunt field burns out, due to this excessive voltage.

It is the object of this invention to produce a generator in which the voltage will never exceed a predetermined value, regardless of whether the circuit from the armature to the battery is open or closed. My invention briefly described consists in constructing a generator in such a way that the pole pieces are formed of very soft iron and are fastened to a base of non-magnetic metal so that there is no complete magnetic circuit in the generally accepted sense. To these pole pieces so connected to each other, I secure a permanent electro-magnet that magnetizes the pole pieces and produces flux, of a certain value, between the adjacent pieces and through the armature. The armature winding is then calculated so that when the armature rotates at the speed that corresponds to a speed of approximately ten miles an hour of the automobile, the voltage generated between the brushes is 7 volts, or sufficient to operate the cut-out mechanism and connect the generator to the battery.

It is evident that if I depended merely on the permanent field that I would be unable to attain the regulation which I desire, as the field would be approximately constant whereas the distortion and the cross-magnetization would vary with the speed and load. To compensate for this variation I provided my generator with brushes placed approximately 90 degrees apart, one of which is adjustable so as to increase the angle to any extent that may be found necessary, in order to produce the proper regulation. The conductors from one of these brushes extend to a series field winding of a few turns so that the current generated by the machine will all be employed to affect the field strength of the generator. The number of turns in the series field is so calculated that it will counterbalance the effect produced by the field distortion and the cross-magnetization of the armature for any loads between zero and maximum load, and at any speed.

In order to more clearly describe my invention I shall have reference to the accompanying drawing in which it has been illustrated diagrammatically and in which Fig. 1 shows in a diagrammatic way the construction of my improved generator.

Figure 2:
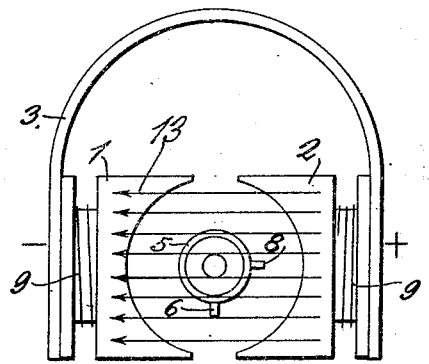
Figure 3:
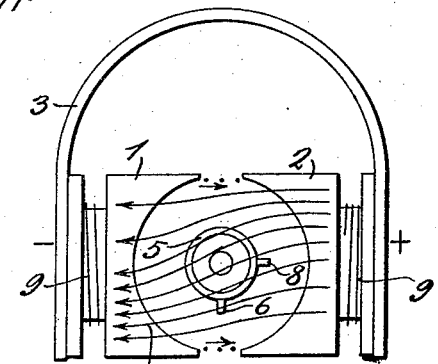

Fig. 2 is a diagram showing the permanent field when the generator is standing still or inoperative; and Fig. 3 shows the position of the field at high speeds and also indicates diagrammatically the cross-magnetization due to the current flowing in the armature.

Numerals 1 and 2 indicate large, soft iron pole pieces having small retentivity, while 3 represents a permanent electromagnet, the pole pieces of which are connected to the corresponding pole pieces 1 and 2. Rotatably mounted between the concave faces of the pole pieces is an armature 4. This armature is constructed in the usual manner. At one end of the armature 4 is the usual commutator 5. Two brushes 6 and 7 contact with the commutator at diametrically opposed points and lie in a plane substantially perpendicular to the plane of the pole pieces. A third brush 8 contacts with the armature at some point between brushes 6 and 7, and is adjustable so as to increase the angle between it and brush 6 from 90 to approximately 180 degrees. Brush 8 is connected to the series field coils 9 and the battery 10 is connected between the conductor 11 that connects with the field coil and the conductor 12 that connects with brush 6.

In Fig. 2 I have indicated by means of lines 13 the flux that passes between the poles as a result of the magnetizing action of the permanent magnet. When the generator is rotated in the direction indicated by the arrow in Fig. 1, the armature conductors will cut the lines of force and set up an electromotive force between the brushes in a manner well understood. The armature winding has been so calculated that when the generator attains a speed corresponding to a speed of ten miles an hour by the automobile the pick-up voltage will be reached. This voltage as above indicated is usually about 7 volts. When this voltage is attained, the cutout 14 will automatically connect the generator to the battery and the latter will receive a charge. As the speed of the automobile increases, if other conditions remained constant, the voltage would also increase, which would increase the charging current to the battery. This, however, is prevented by the fact that as the speed increases there will be a corresponding increase in the distortion of the field, which will cause the lines of force to pass from one pole to the other in a diagonal direction, somewhat as shown in Fig. 3. This distortion weakens the field between brushes 6 and 8 with the result that even at the increased speed only the same voltage will be generated. In addition to the distortion there is a cross-magnetizing effect produced by the armature, which however remains substantially constant for constant currents. By properly proportioning the number of turns in the field winding 9, it is possible to produce a magnetizing effect that is just sufficient to maintain the voltage between brushes 6 and 8 constant for any speeds at which the generator may be working. This is due to the fact that the magnetic circuit is substantially open, as the permanent magnet by which the pole pieces are connected is saturated or nearly so and therefore it has no appreciable effect on the flux produced by the series winding.

It is evident that if the brush 8 is moved upwardly to one or the other of the dotted line positions shown in Fig. 1, that a greater number of lines of force will be included between the extreme coils of the armature than are embraced in the arc between these two brushes, with the result that the voltage produced by any given flux is increased. This adjustment may be sufficient to move the brush 8 through an arc of 90 degrees, or to the position of brush 7 shown in Fig. 1. The series field coil is so calculated that the armature reaction is balanced at any load by the action of the coil on the field, and this tends to produce constant voltage for any load, while the field distortion due to the increased speed compensates for the voltage increase that would otherwise arise due to the increased speed.

By properly adjusting the brush 8 and properly calculating the effect of the coil 9, it is evident that constant voltage can be attained at any load and at any speed.

Let us assume a case in which the cut-out fails to operate and in which the automobile's speed is gradually increased to a very high rate. As long as there is no current flowing through the series coil this is of course ineffective and the only flux that affects the armature is that produced by the permanent magnet. The high speed, however, distorts this field into such a position that very little of this field affects the coils between brushes 6 and 8, with the result that the voltage remains practically constant or rises very little above the calculated maximum. As the field winding is so related to the magnetic circuit that it has an accumulative effect on the magnetization due to the permanent magnet, it is obvious that it tends to strengthen the permanent magnet at all times, so that the latter always remains fully charged. This assures that there will always be a constant field that produces the pick-up voltage at substantially the same speed in all cases. Since the pole pieces 1 and 2 are quite massive and are formed of metal having a very small retentivity, the flux is easily displaced and the regulation for speed is therefore readily obtained.

I also wish to call particular attention to the fact that the magnetic circuit through the permanent magnet is for all practical purposes ineffective so far as it may have relation to the carrying of additional flux that is produced by the series coil, for the reason that the permanent magnet is made of very hard steel and is practically saturated at all times. Besides this, the magnetic circuit through the permanent magnet is so small that its effect is practically nil. There is therefore only a leakage path for the flux produced by the coil 9, as it cannot return through the permanent magnet.

It will appear from the above that I have produced a generator that is exceedingly well adapted for use in connection with automobiles, as it has been so designed that it produces practically constant voltage at all speeds and automatically regulates itself, with respect to the load as well as to the speed; that this effect has been produced by exceedingly simple means which make it possible to construct this generator at very small cost. By means of this generator there is absolutely no danger of overcharging the battery or of burning out the generator. Even where the cut-out fails to work and the speed is excessive, the voltage will increase only slightly above the normal, and even if the voltage did increase to a considerable extent there would be no danger of burning out the generator, due to the fact that there are no shunt windings.

Having now described my invention what I claim as new is:

A constant voltage variable speed generator comprising in combination, a permanent magnet, a soft iron pole piece of small retentivity attached to each pole of said electromagnet, said pole pieces being provided with concave faces adapted to cooperate with an armature, an armature mounted for rotation between said poles, a commutator associated with said armature, a pair of brushes operatively associated with said commutator, one of said brushes being located substantially at the neutral point of said commutator and the other brush contacting with the commutator at a point spaced from the first named brush an angle of less than 180 degrees, in the direction of rotation, and a series field coil connected to one of said brushes.

In testimony whereof I affix my signature.

GEORGE H. SETHMAN.